Oct. 13, 1931.   C. R. SHORT   1,827,268
RUBBER SPRING SHACKLE
Original Filed Feb. 4, 1927

Inventor
Charles R. Short
By Blackmore, Spencer & Hurd
Attorneys

Patented Oct. 13, 1931

1,827,268

UNITED STATES PATENT OFFICE

CHARLES R. SHORT, OF DETROIT, MICHIGAN, ASSIGNOR TO GENERAL MOTORS RESEARCH CORPORATION, OF DETROIT, MICHIGAN, A CORPORATION OF DELAWARE

RUBBER SPRING SHACKLE

Original application filed February 4, 1927, Serial No. 165,887. Divided and this application filed July 23, 1931. Serial No. 552,590.

This invention relates to the construction of rubber spring shackles and the novelty resides in eliminating any rubbing action or friction between the rubber and metal parts, characteristic of prior constructions. This rubbing action is deleterious to the rubber and wears it away in a short time and when applied to vehicle springs this worn away portion will allow the vehicle body to sway from side to side producing shimmying, i. e., allowing the wheels to move bodily relative to the body of the car. Or when turning, the wheels will take their proper course around the curve but the body will tend to go straight ahead and the play allowed by the worn shackle will cause a sway of the body relative to the wheels.

A common trouble with rubber or rubber fabric shackles is the lateral flexibility which affects steering and induces low speed shimmying. Free movement must be provided to accommodate the lengthening of spring but all movement at right angles to the length of the spring should be avoided. It is proposed to confine the rubber in a pocket from which it is prevented from flowing, for in this manner it will resist deflection in one direction while permitting free movement in the desired direction.

My invention further is concerned with an improved method of making rubber bearings, which consists in extruding the rubber in tube form of required dimensions as to outside diameter and size of hole, cutting the tube to required lengths, placing the sections so made upon a hollow arbor or tube, which may be cylindrical of polygonal and straight or formed with transverse corrugations throughout all or part of its length. A tubular member is then placed over the rubber ring section and contracted by swaging or pressing to the required diameter, the tube at the same time being elongated. The rubber ring will be deformed and placed under tension causing it to practically fill the annulus between the inner core member and the outer or shell member. A small space is allowed between the rubber and the ends of the shells to prevent any rubber-metal rubbing action.

The outer or shell member may be further formed by rolling or pressing to form corrugations at right angles to its axis. The purpose of so forming the inner core member and the outer shell being to limit the possible movement of the bearing along its axis while permitting it to rotate more or less freely according to the composition of rubber used and the degree of compression to which it is subjected by contracting the outer shell.

The rubber portion may also be distorted and placed in tension by expanding the inner core member by means of a taper plug, or by hydraulic means.

My invention is shown in several different forms in the accompanying drawings in which.

Figure 1:
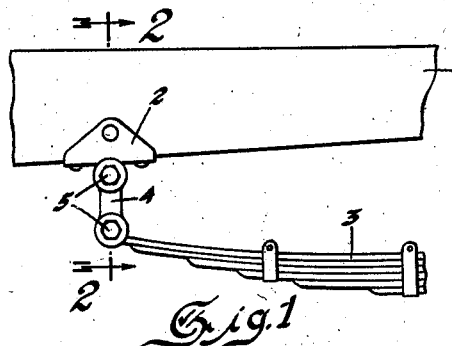
Figure 1 is a side view of a portion of an automobile necessary to illustrate my invention.

Referring to Figure 1, 1 designates the side bar of the chassis, 2 the spring bracket secured to the chassis 1, 3 the usual leaf spring and 4 the shackle arms. 5 designates the shackle bolts which extent through the eye 6 of the bracket or the eye 7 of the spring 3. Surrounding the bolt 5 is an inner shell 8 which is enclosed in an outer shell 9 closely fitting within the eye 6 of the bracket. Between the shells 8 and 9 is a yieldable tubular filler member 10 which may be of any suitable material, but is preferably of rubber, and is slightly spaced from the ends of the shells as shown at S. The shells 8 and 9 at their ends are in close contact with the shackle arms 4 and are thereby incapable of any transverse movement.

Figure 2:
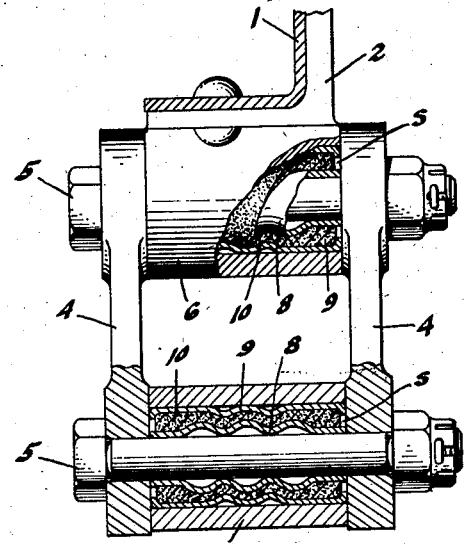
Figure 2 is a section on line 2—2, Figure 1, with parts shown in section for purposes of clearer illustration.
Figure 3:
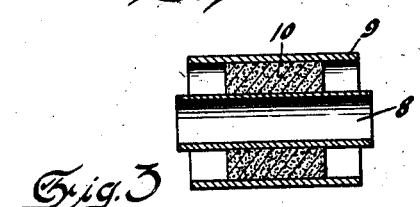
Figures 3 and 4 show different stages of the construction of my improved joint.
Figure 4:
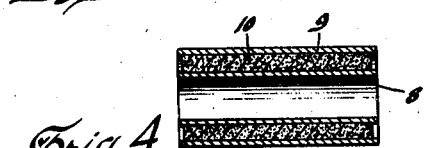

In Figures 3 and 4 the assembly of my novel joint is better shown. The tube of rubber 10 is assembled over the shell 9 and the shorter shell 9 in turn placed over the rubber cylinder 10. By a swaging action the cylinder 9 is deformed or contracted and forced closer to the cylinder 8, causing the yielding material 10 to be compressed and spread and substantially fill in the annulus between the two shells, as shown in Figure 4. The completed joint member is shown in Figure 4 in which the shells 8 and 9 are the same length and in this form is assembled within the shackle as shown in Figure 2.

Figures 5, 6:
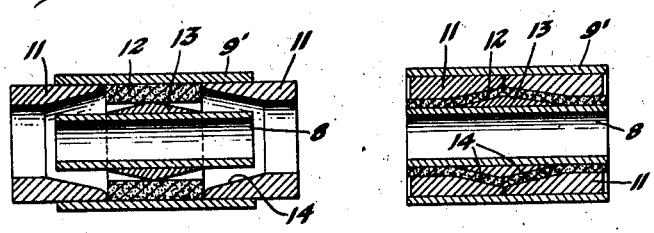
Figures 5 and 6 show a modified form in different stages of construction.

In the modification in Figures 5 and 6, the inner shell 8 is the same as in previous figures, while 9′ indicates an outer shell, the equivalent of the shell 9 in Figure 2. 11 denotes two wedge members or bushings placed in either end of the shell 9′, and 12 is a tube of resilient material, preferably rubber. The inner shell 8 has a ring 13 triangular in cross section surrounding its central portion. The bushings 11 are tapered at their inner ends as shown at 14 and by forcing these bushings toward each other the rubber 12 is compressed and caused to spread and fill in the space between the wedges, the shell 8 and its ring 13 as is shown in Figure 6. In the final form of the joint member the rubber is under compression.

In the modification shown in Figures 7 and 8, the inner shell 8′ is corrugated or ribbed transversely of its length as shown at 15, while the outer shell 9a is swaged onto the rubber 10 and the lower shell and later formed with the protuberance or corrugations 16 which conform to the corrugations 15 of the shell 8′. The shell 9a has small inturned flanges 17 at its ends for strengthening purposes and to assist in retaining the rubber, but these flanges are unessential and may be omitted. To prevent friction between the rubber and flanges 17 a small space S is allowed therebetween. In the joint member in its final form as shown in Figure 8 the rubber 10 is under compression and closely fills the corrugations and the space between the shells 8′ and 9a.

Figure 9:
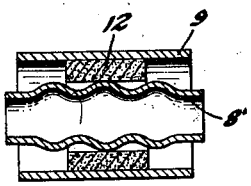
Figures 9 and 10 show a third modification in two different stages of construction.
Figure 7:
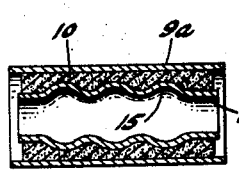
Figures 7 and 8 show a second modification in two different stages of construction, Figure 8 showing the structure after the swaging has taken place.
Figure 8:
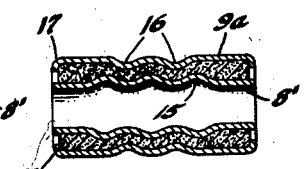
Figure 10:
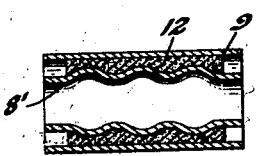

In the modification shown in Figures 9 and 10, the inner shell 8′ has transverse corrugations similar to the corrugations shown in the inner shell in Figures 7 and 8 and the outer shell 9 surrounds the rubber tube 12 as in the previous forms and is swaged on to the inner shell causing the rubber 12 to be compressed and spread and substantially fill the nodes between the corrugations and the space between the shells 8′ and 9 as is shown in Figure 10.

With the structures as shown in the figures described the arrangement is such as will permit a rotational, a longitudinal or up and down motion within the limits allowed by the compressed rubber but will resist any transverse movement with reference to the vehicle. This is particularly true of a species wherein the bushings are corrugated, the corrugations tending to prevent any transverse movement of the parts.

This application is a division of my prior application Serial No. 165,887, filed February 4, 1927.

I claim:

1. A joint comprising a bolt and arms, a shell surrounding said bolt, a second shell surrounding the first shell, the ends of both shells abutting said arms, a resilient material under compression arranged between said arms and shells but out of contact with said arms, and an eye member surrounding said second shell.

2. In a joint, a bolt and arms, a cylindrical shell surrounding said bolt and having portions thereof pressed from its surface, a second shell surrounding said first shell and having portions thereof pressed from its surface, a resilient material under compression arranged between said shells but out of contact with said arms, and an eye member surrounding said second shell.

3. In a spring shackle joint, a frame, a bracket secured to the frame, an eye on the bracket, a spring having an eye, a pair of shackle arms at the two sides of the bracket and spring eyes, and a joint member in each eye, said member comprising an inner bolt receiving shell and an outer shell closely received within the eye, protuberances on both shells, and an elastic medium under compression between said shells.

4. A resilient joint, comprising a cylinder forming a journal, a socket of larger diameter at the central portion than at the ends, and a tube made of resilient material firmly compressed between the central cylinder and the socket.

5. A joint comprising an inner corrugated shell, an outer cylindrical shell of greater length than the inner shell and an elastic medium between said shells.

In testimony whereof I affix my signature.

CHARLES R. SHORT.